United States Patent Office 3,348,612
Patented Oct. 24, 1967

3,348,612
CEMENTING CASING IN OIL-WET WELLS
Joseph U. Messenger, Dallas, Tex., assignor to Mobil Oil Corporation, a corporation of New York
No Drawing. Filed Sept. 15, 1965, Ser. No. 487,602
13 Claims. (Cl. 166—29)

This invention relates to cementing casing in a well penetrating subterranean formations. More particularly, the invention relates to cementing casing in a well which has been wet by an oil phase.

For various purposes, wells are drilled from the surface of the earth to subterranean formations. Thus, for example, wells are drilled to subterranean formations to produce and recover a fluid such as water, gas, or oil from the formations. In the drilling of such wells by the rotary method, a drilling mud is pumped from the surface of the earth through the drill pipe to the drill bit. The drilling mud then flows upward from the drill bit through the well between the drill pipe and the wall of the well to the surface of the earth. The drilling mud performs various functions such as lubricating the bit and carrying cuttings from a drilled formation out of the well. Recently, it has been found advantageous to use an oil-base drilling mud to perform these functions as well as prevent or lessen damage to the subterranean formations through which the well is drilled. Alternatively, oil may be emulsified into a water-base, emulsion drilling fluid. The chemical components of such drilling fluids render the wall of the well, as well as any casing immersed therein, preferentially oil-wettable. The oil component then forms a film thereon. Such surfaces having an oil film are referred to as being oil-wet. Being oil-wet, they are hydrophobic, or water repellent.

In order to prevent entry into the well of a fluid from a formation other than the desired producing formation after the well has been completed, the well is provided with a casing extending to at least the desired producing formation. The casing is cemented in place, and cementing is effected by pumping a cement slurry, upward from the bottom of the casing where possible, through the annular space between the outer surface of the casing and the wall of the well. The cement thus forms an impermeable sheath bonding the casing to the producing and other formations. After the cement has set, the casing and the cement sheath in the annulus are perforated to the producing formation. Thus, fluid can pass from the desired producing formation into the casing, but fluid from other formations cannot pass into the casing.

In this cementing operation in a well, difficulty is often encountered as a result of employing oil-containing drilling mud during the drilling operation. The cement slurry which is employed is generally a water-suspension or a water-base slurry. On the other hand, the outer surface of the casing and the wall of the well are oil-wet and hydrophobic. Thus, the casing and the wall of the well will resist bonding to any cement which sets up from the water-base cement slurry. Further, the oil components in the filter cake which will have formed to some degree on the wall of the well from the oil-containing drilling fluid will aggravate the problem of effecting a good bond. Accordingly, in cementing operations in a well it is highly desirable to effect substantially complete removal of the oil components of the drilling mud prior to placing the cement slurry in the well.

It is an object of this invention to provide an improved multistep method for cementing casing in a well penetrating a subterranean formation.

It is another object of this invention to remove hydrophobic films from the surfaces of the casing and the wall of the well and improve their bonding to cement which is set therebetween.

It is a particular object of this invention to provide a method for displacing all remnants of oil from both the surface of the casing and the wall of the well before setting a cement therebetween, thus effecting superior bonding of the cement sheath both to the surface of the casing and the wall of the well.

These and other objects of the invention will become apparent from the following detailed description.

In accordance with the invention, there is provided a method which involves as its essential steps passing into a well between the wall of the well and the outer surface of a casing which is to be cemented in the well:

(a) a slug of liquid having mutual solubility for oil and water, and then
(b) an aqueous Portland cement slurry, and allowing the cement slurry to set in place between the casing and the wall of the well.

The liquid having mutual solubility for oil and water removes any hydrophobic film which may be present on the surface of the casing, the wall of the well, or any filter cake which may have built-up on the wall of the well. Further, it has the property of rendering a surface over which it is passed preferentially wettable by the next phase which that surface encounters. Thus, the aqueous phase cement slurry will create a preferentially water-wettable surface and will in turn wet that surface. Hence, a superior bond is established between the cement which sets from the cement slurry and the casing, and between the cement and the wall of the well.

By the liquid having mutual solubility for oil and water is meant an organic compound containing both a hydrocarbon group and a polar group.

A system for classifying organic compounds based upon solubility in various liquids has been developed. This classification has been described, for example, by Shriner and Fuson in The Systematic Indentification of Organic Compounds, 8th edition, John Wiley & Sons, Inc. (1940). One class of compounds described by these authors is identified by them as Class $S_1$. In this class are the compounds which are soluble in water and in ether. Solubility in benzene can be substituted for solubility in ether. A compound is regarded as being soluble if 0.2 cubic centimeter of the solute will dissolve in 3 cubic centimeters of the solvent at room temperature. Compounds in this Class $S_1$ can be employed in the practice of the invention as liquids having mutual solubility for oil and water.

Particular compounds which have been found to be useful include:

methyl alcohol,
ethyl alcohol,
propyl alcohol,
isopropyl alcohol,
n-butyl alcohol,
isobutyl alcohol,
tertiary butyl alcohol,
2-pentyl alcohol,
tertiary amyl alcohol,
dichloro tertiary butyl alcohol,
allyl alcohol,
ethylene glycol,
propylene glycol,
diethylene glycol,
butyl glycol,
tetraethylene glycol,
dipropylene glycol,
tripropylene glycol,
dioxane,
dimethyl sulfoxide,
ethylene glycol monomethyl ether,
ethylene glycol monoethyl ether (generally termed ethyl Cellosolve), ethylene glycol monopropyl ether,
ethylene glycol monobutyl ether (generally termed butyl Cellosolve),
ethylene glycol monophenyl ether,
propylene glycol methyl ether,
diethylene glycol n-butyl ether,
dipropylene glycol monomethyl ether,
tripropylene glycol monomethyl ether,
ethylene glycol dimethyl ether,
diethylene glycol dimethyl ether,
triethylene glycol dimethyl ether,
tetraethylene glycol dimethyl ether,
glycerol triacetate,
methyl acetate,
diethylene glycol monoethyl ether,
methyl acetoacetate,
acetone,
methyl ethyl ketone,
trichloro acetaldehyde (chloral),
pyridine, and
acrylaldehyde (acrolein).

Of these liquids, it is preferred to employ either ethylene glycol monomethyl ether, ethylene glycol monoethyl ether, ethylene glycol monobutyl ether, isopropyl alcohol, tertiary butyl alcohol, or diethylene glycol monoethyl ether. Of these, ethylene glycol monobutyl ether is most preferred.

A single liquid having mutual solubility for oil and water may be preferred. On the other hand, mixtures of liquids having mutual solubility for oil and water may be employed.

The amount of the liquid having mutual solubility for oil and water to be employed as a preflush for the cement will depend upon the diameter and depth of the well and amount of hydrophobic material therein. For example, in small diameter wells it may be advisable to use as little as 5 barrels, or less. On the other hand, in larger diameter wells penetrating more deeply into subterranean formations it will be preferable to employ from about 5 barrels to about 10 barrels. In large diameter, very deep wells, or having large quantities of hydrophobic material therein, it may be necessary to employ as high as 100 barrels, or more, of the liquid having mutual solubility for oil and water.

In a particular aspect of the invention, as a preliminary step, a slug of an organic solvent for oil and asphalt is passed through the annular space between the outer surface of the casing and the wall of the well ahead of the slug of liquid having mutual solubility for oil and water.

The slug of organic solvent for oil and asphalt dissolves or miscibly displaces all oil and any asphalt which tend to remain in the voids of any filter cake which may be on the wall of the well. Further, the organic solvent for oil and asphalt miscibly displaces any oil-base drilling fluid, or oil constituents, up the annnular space to the surface and dissolves any hydrophobic films which tend to remain, leaving behind a film of organic solvent which is more soluble in the liquid having mutual solubility for oil and water than is the oil constituent of the drilling fluid.

Any of the known organic solvents for oil and asphalt may be employed. Illustrative of suitable organic solvents for oil and asphalt are diesel oil, kerosene, carbon disulfide, benzene, toluene, and xylene. Of these, carbon disulfide is preferable from a technological standpoint since it has substantially complete miscibility with the liquid having mutual solubility for oil and water and dissolves significantly greater quantities of oil, asphalt, or hydrophobic constituents which have been deposited from the oil-base drilling fluid. On the other hand, diesel oil or kerosene offer a substantial economic advantage. Mixtures of these organic solvents may be employed.

The amount of the organic solvent for oil and asphalt to be employed as a preflush in advance of the liquid having mutual solubility for oil and water will depend, similarly as the liquid having mutual solubility for oil and water, upon the diameter and depth of the well, and amount of hydrophobic material therein. It may be possible to use as little as 5 barrels, or less. It generally will be preferable to employ from about 5 barrels to about 10 barrels. In large diameter, deep wells, or wells having large quantities of hydrophobic material therein, it may be necessary to employ as high as 100 barrels, or more, of the organic solvent for oil and asphalt.

Having thus described the invention, it will be understood that such description has been given by way of illustration and example and not by way of limitation, reference for the latter purpose being had to the appended claims.

What is claimed is:

1. A method of cementing casing in a well penetrating subterranean formations which comprises the steps of:
   (a) flowing a slug of liquid having mutual solubility for oil and water through the annular space between said casing and the wall of said well;
   (b) flowing through said annular space and emplacing therein a cement slurry between said casing and said wall of said well; and
   (c) allowing said cement slurry to set and form an impermeable cement sheath bonding said casing to said wall of said well.

2. The method of claim 1 wherein said liquid having mutual solubility for oil and water comprises ethylene glycol monomethyl ether, ethylene glycol monoethyl ether, ethylene glycol monobutyl ether, tertiary butyl alcohol, diethylene glycol monoethyl ether, isopropyl alcohol, or mixtures thereof.

3. The method of claim 2 wherein said liquid having mutual solubility for oil and water is ethylene glycol monobutyl ether.

4. The method of claim 1 wherein said slug of step (a) contains from about 5 to about 100 barrels of liquid having mutual solubility for oil and water.

5. The method of claim 4 wherein said slug of step (a) contains from about 5 to about 10 barrels of liquid having mutual solubility for oil and water.

6. The method of claim 1 wherein said flowing of said slug of said liquid of step (a) and said cement slurry of step (b) is upward through said annular space.

7. A method of cementing casing in a well penetrating subterranean formations which comprises the steps of:
   (a) flowing a slug of an organic solvent for oil and asphalt through the annular space between said casing and the wall of said well;
   (b) flowing through said annular space a slug of liquid having mutual solubility for oil and water;
   (c) flowing through said annular space and emplacing therein a cement slurry between said casing and said wall of said well; and
   (d) allowing said cement slurry to set, forming an impermeable cement sheath bonding said casing to said wall of said well.

8. The method of claim 7 wherein said organic solvent for oil and asphalt comprises diesel oil, kerosene, carbon disulfide, benzene, toluene, xylene, or mixtures thereof.

9. The method of claim 7 wherein said liquid having mutual solubility for oil and water comprises ethylene glycol monomethyl ether, ethylene glycol monoethyl ether, ethylene glycol monobutyl ether, tertiary butyl alcohol, diethylene glycol monoethyl ether, isopropyl alcohol, or mixtures thereof.

10. The method of claim 7 wherein said liquid having mutual solubility for oil and water is ethylene glycol monobutyl ether.

11. The method of claim 7 wherein said slug of step (a) contains from about 5 to about 100 barrels of organic solvent for oil and asphalt and said slug of step (b) contains from about 5 to about 100 barrels of liquid having mutual solubility for oil and water.

12. The method of claim 7 wherein said slug of step (a) contains from about 5 to about 10 barrels of organic solvent for oil and asphalt and said slug of step (b) contains from about 5 to about 10 barrels of liquid having mutual solubility for oil and water.

13. The method of claim 7 wherein said flowing of said slug of said organic solvent for oil and asphalt of step (a), said slug of liquid having mutual solubility for oil and water of step (b), and said cement slurry of step (c) is upward through said annular space.

References Cited

UNITED STATES PATENTS

| | | |
|---|---|---|
| 2,204,223 | 6/1940 | Lawton et al. |
| 2,327,017 | 8/1943 | Chamberlain. |
| 2,633,919 | 4/1953 | Bauer et al. |
| 2,675,082 | 4/1954 | Hall _____ 166—21 |
| 2,749,989 | 6/1956 | Huber _____ 166—21 |
| 2,832,414 | 4/1958 | Battle _____ 166—29 X |
| 3,022,824 | 2/1962 | Binkley et al. |
| 3,027,943 | 4/1962 | Reistle. |
| 3,126,958 | 3/1964 | Bearden et al. _____ 166—29 |
| 3,131,759 | 5/1964 | Slusser et al. |
| 3,176,769 | 4/1965 | Treadway et al. _____ 166—33 |

CHARLES E. O'CONNELL, *Primary Examiner.*

STEPHEN J. NOVOSAD, *Examiner.*